United States Patent
Hentschel et al.

(10) Patent No.: US 6,577,025 B2
(45) Date of Patent: Jun. 10, 2003

(54) ELECTRICAL WIRING SYSTEM FOR THE DRIVE UNIT IN VEHICLES

(75) Inventors: Andreas Hentschel, deceased, late of Vilsbiburg (DE), by Gabriele Hentschel, legal representative; Manfred Kasprzok, Frontenhausen (DE); Max Gröbmair, Dietramszell (DE); Fred Eckstein, München (DE)

(73) Assignee: Lisa Draxlmaier GmbH, Vilsbiburg (DE)

(*) Notice: Subject to any disclaimer, the term of this patent is extended or adjusted under 35 U.S.C. 154(b) by 0 days.

(21) Appl. No.: 09/988,797

(22) Filed: Nov. 20, 2001

(65) Prior Publication Data

US 2002/0067077 A1 Jun. 6, 2002

Related U.S. Application Data

(63) Continuation of application No. PCT/EP00/04788, filed on May 25, 2000.

(30) Foreign Application Priority Data

May 25, 1999 (DE) .......................................... 199 23 893

(51) Int. Cl.[7] .............................................. B60R 16/02
(52) U.S. Cl. ...................................... 307/10.1; 307/147
(58) Field of Search ................................ 307/10.1, 147

(56) References Cited

U.S. PATENT DOCUMENTS

| | | | | |
|---|---|---|---|---|
| 3,996,914 A | | 12/1976 | Crall et al. .............. 123/198 E |
| 4,403,155 A | * | 9/1983 | Aoki et al. ................. 307/10.1 |
| 4,942,571 A | * | 7/1990 | Moller et al. ............... 307/10.1 |
| 4,956,561 A | * | 9/1990 | Tamer ........................ 174/52.2 |
| 5,179,503 A | * | 1/1993 | Fouts et al. ................. 307/10.1 |
| 5,349,747 A | * | 9/1994 | Dennis ........................ 29/832 |
| 5,442,518 A | * | 8/1995 | Beam ........................ 138/103 |
| 5,623,169 A | * | 4/1997 | Sugimoto et al. .......... 307/10.1 |
| 6,048,020 A | * | 4/2000 | Gronowicz et al. ....... 174/72 A |
| 6,107,696 A | * | 8/2000 | Peter et al. ................ 307/10.1 |
| 6,218,740 B1 | * | 4/2001 | Mildice ..................... 307/10.1 |
| 6,249,060 B1 | * | 6/2001 | Osha ........................ 307/10.1 |
| 6,249,425 B1 | * | 6/2001 | Sudo et al. ................ 174/72 A |

FOREIGN PATENT DOCUMENTS

| | | |
|---|---|---|
| DE | 195 11 755 C1 | 8/1996 |
| DE | 197 19 192 A 1 | 11/1998 |
| EP | 0 031 400 | 7/1981 |
| EP | 0 413 380 A1 | 2/1991 |
| EP | 0 623 977 A1 | 11/1994 |
| EP | 0 674 100 A1 | 9/1995 |
| EP | 0 740 365 A2 | 10/1996 |
| EP | 0 768 212 A2 | 4/1997 |
| EP | 0 857 618 A2 | 8/1998 |
| GB | 2 165 398 A | 4/1986 |
| GB | 2 305 548 | 4/1997 |

* cited by examiner

Primary Examiner—Fritz Fleming
(74) Attorney, Agent, or Firm—Nath & Associates PLLC; Gary M. Nath; Marvin C. Berkowitz

(57) ABSTRACT

The invention relates to an electrical wiring system for the drive unit in automobiles, especially for a combustion engine having a transmission, comprising a central distribution unit (1), first electrical connections (8, 9) between the vehicle and the distribution unit (1), second electrical connections (3) between the distribution unit (1) and the functional units (4) of the drive unit (7) or in the surrounding engine area, wherein the first (8, 9) and the second (3) electrical connections are configured as electrically non-branching point-to-point connections, the interconnections (10) between the first and the second electrical connections are configured in the central distribution unit, the central distribution unit (1) is mounted on the drive unit (7) and the central distribution unit (7) comprises a control platform (6) with at least one electronic control module (5).

16 Claims, 2 Drawing Sheets

ELECTRICAL WIRING SYSTEM FOR THE DRIVE UNIT IN VEHICLES

This application is a Continuation of International Application No. PCT/EP00/04788 with an international filing date of May 25, 2000.

TECHNICAL FIELD

The invention relates to an electrical wiring system for the drive unit in vehicles, which will be referred to in the following merely as wiring. The wiring is, in particular, destined for the drive unit, i.e. in particular for the internal combustion engine and transmission of a motor vehicle. It may, however, also be used for motorcycle engines, boat engines or aircraft engines.

STATE OF THE ART

Hitherto, a wiring harness has been provided in the engine compartment of a motor vehicle, which connects the functional units of the internal combustion engine and other electrical functional units within the engine compartment with each other and with the rest of the vehicle as far as the electrical power supply and the exchange of data and signals is concerned. Such functional units are, in particular, sensors, such as knock or oil level sensors, and actuators, such as injection and ignition means. Apart from electrical wires, wiring harnesses may, in particular, also include optical wires, for example optical waveguides.

Traditional wiring looms, such as shown for example in DE 3824857 and the DE 3903818, have a tree-like structure with a great variety of branches and ramifications. The production of such a wiring loom requires a large number of manual processes. Another problem is that, due to the drastically increasing number of functional units and functional contents of engines and transmissions, the wiring looms contain more and more wires and thus increase in weight and volume. Thus, the technical designers face increasing difficulties when accommodating the wiring loom in the engine compartment.

Furthermore, today, so-called electronic boxes (E-boxes) are rigidly mounted to the car body in the engine compartment and connected to the wiring loom. Such E-boxes, such as disclosed for example in WO 96/00156 and in DE 19511755, contain an increasing number of electronic control devices for the engine and its units as well as relay components. The control devices have their own casings which, in part, contain passive cooling elements. The control devices and the relays are placed within a voluminous plastic casing of the E-box with the control devices and relays connected individually via plug-type connections and plug bases directly to the wiring loom. The result is, on the one hand, that the E-box is of a considerable size, which in turn, triggers positioning problems, and on the other hand it is time-consuming to assemble due to the manual assembly of the numerous plug-in connections between the wiring loom and the E-box.

EP 0 674 100 A1 describes a system for the operation and control of sensors, apparatus and functional units of a vehicle with the electronic control device 4 being mounted at or within an air intake of an internal combustion engine. The electronic control device 4 comprises three connectors 5A, 5B, 5C, which are connected to the corresponding counter connectors 6A, 6B, 6C. These counter connectors, in turn, are connected to the corresponding bundles of electric cables 7A, 7B, 7C. The first bundle 7A is responsible for the electrical connection to the sensors, apparatus and activators in the vehicle body. The second bundle 7B is responsible for the electrical connection to the sensors, apparatus and activators in the engine. Finally the third bundle 7C is responsible for the electrical connections to the sensors, apparatus and activators in the air intake 3.

Furthermore, EP 0 857 618 A2 describes a motor control device 17 which is mounted on the engine block in a section 12D of the engine 12. Furthermore, the motor control device 17 has a circuit plate 17D with a CPU. The motor control device 17 is mounted on the engine and connected to switches and functional units by means of a traditional wiring loom (cf. column 3, lines 50 to 58).

DESCRIPTION OF THE INVENTION

The invention is based on the technical problem of creating an electrical wiring system for the drive unit in a vehicle in which the issue of accommodating the wiring is improved, whilst at the same time simplifying the manufacture and installation of the wiring.

This technical problem is, according to the invention, solved by an electrical wiring system with the features of point-to-point connections. The related circuits of the first and second electrical connections are made within the central distribution unit. This central distribution unit is mounted on the drive unit and comprises a control platform with at least one electronic control module.

Thanks to this wiring concept with a central circuit and electrical point-to-point connections, there are no electrical branches as in the case of the traditional wiring harness. Thus, the cable end connectors, which until now had to be produced at considerable manual effort on the wiring harness, are no longer required. In this respect, it was, for example, necessary to join certain bared cable ends manually to form a circuit, to solder them to each other (or to weld or to crimp them) and to fit them with a protective cap. In the case of the wiring that is object of the invention, connector cables are now used that can be standardized in terms of number of pins, length, conductor cross section, etc. In this respect, several electrical point-to-point connections can be spatially combined, at least in part, for example in the form of a foil wire with several electrical strip conductors that are arranged in parallel. Such individual strip conductors may, if necessary, naturally be branched off geometrically from the foil wire i.e. the foil wire may—for example, by careful opening or unravelling of its foil connections between the electrical strip conductors—be gradually divided into individual strip conductors so that they can be brought to the corresponding connecting points.

According to the invention, electrically non-branching point-to-point connections are provided, i.e. individual strip conductors or conductors, for example copper conductors, which do not have any electrical branches or taps. A geometrical, i.e. spatial branching or sub-division of the bundles of wires, foil wires etc. is naturally possible according to the invention, if the individual electrical conductors or strip conductors only form point-to-point connections.

Such standardized interconnections can be produced in an automated process, since the interconnections themselves no longer contain circuits. This results in corresponding production advantages, and manual production effort can be minimized in the wiring that is the object of the invention.

Also, mounting the central distribution unit on the drive unit directly in accordance with the invention and integrating the electronic control modules within the central distribution unit can considerably reduce the extent of the wiring and save wire length. The electronic control modules that correspond in functional terms to the control devices that have been customary up to the present, may now, according to the invention, be integrated without an individual casing directly on the control platform. For this purpose, the control platform is configured preferably as a fixed or flexible circuit board or FPC (flexible printed circuit) plate. It may, however, also be configured as a fixed or flexible circuit component in other suitable techniques that are known to the skilled person, for example as a printed or etched circuit board or using MID (moulded interconnect device) technology. The control platform also preferably includes the contact points and interfaces to the interconnections.

Thus, the traditional E-boxes with their numerous interfaces and slots and their considerable physical size can, according to the invention, be dispensed with. Instead, the traditional control devices with their casings can be replaced by electronic control modules that are directly installed on the control platform. The circuit of the electrical connections is linked with the electronic control systems and also made on the control platform. Thus, also numerous bulky and expensive plug-in and cable connections, which are until now required in the E-box, become obsolete. Furthermore, the labour-intensive manual connection of the wiring harness connections with the individual control devices, relay slots, etc. also becomes obsolete.

According to the invention, it was found that mounting the central distribution unit with the control electronics on the drive unit is possible. The central distribution unit is preferably mounted on an internal combustion engine or on the corresponding drive motor of the drive unit or on the accessories of the internal combustion engine or drive motor. The central distribution unit is most advantageously mounted on the air intake, or on the air filter or as an integral component of an already existing engine component or an engine accessory. Furthermore, the central distribution unit may be mounted on the manual gear box or automatic transmission of the drive unit. If the distribution unit is mounted on the engine or its accessories, this results in a completely pre-wired engine with the related control electronics which can be fully bench-tested as a free-standing unit. Thus, the motor with its wiring and control systems may, for example, be manufactured in a country other than the one in which the rest of the vehicle is manufactured and then supplied, ready to be installed, to the final assembly line as a completely function-tested module. Until now, numerous function tests could only be carried out after the installation of the wiring harness in the vehicle and after the numerous connections of the wiring harness to the E-box had been made.

The fixing of a junction box on the front part of the vehicle frame is known from EP 0 031 400 A2. The purpose of this junction box is to distribute the electrical power from the electrical power supply to the components which use the power; these include the front exterior lights of the vehicle, the hooters and the engine-related components which use electricity. In this respect, the power is merely distributed without the junction box having any additional function. No consideration has been given to a central arrangement at the drive unit.

It is more appropriate for at least a single electronic control module to take over engine control functions and/or transmission control functions. It is preferable for the control platform to carry in addition active and/or passive electrical and/or electronic components or modules, such as for example high-level power stages, relays, fuses, capacitors, resistance type suppressors, diodes or such-like that are involved or integrated in the circuits between the first and second electrical connections. Additionally, an external start connection or a high tension current connection can be configured within the central distribution unit. Moreover, plugs for diagnostic purposes may be provided.

The control platform is preferably configured in a modular way. Thus, different types of engines can be accommodated by adding or removing modular platform components. However individual modules can be changed, for repair purposes if necessary.

A clearly organized structure for the wiring results from the invention. The wiring can be built up according to the concrete requirements—as if from building blocks. Thanks to this modular concept, the interconnections can be largely standardized and produced by automated processes. The result is a considerable simplification of the construction process and the manufacture of the wiring.

In case of multiple engine variants the central distribution unit may be configured to meet the maximum requirement, so that the same distribution unit can be used for the different variants without modification. For each variant fewer or different connections may be made to the distribution unit as necessary. Similarly fewer or different electrical/electronic components are placed onto the control platform depending on the variant. Variant-specific circuits may be made simply in the central distribution unit if necessary by the use of so-called jumpers.

A bus connection cable may also be used to connect the central distribution unit with the vehicle using multiplex technology. As a whole the number of first connecting wires can be minimized. As far as the electrical power supply is concerned, only a single supply wire which connects the central distribution unit with the vehicle battery is required. In contrast to the increasing thickness of the traditional wiring harness towards its base, the invention minimises the number of first connections between the vehicle and the distribution unit. These require less space and can easily be placed within the engine compartment.

Thanks to the modular concept of the invention, technical modifications of the wiring can also be carried out relatively easily by means of a corresponding modification of the distribution unit, whereas until now the complete structure of the wiring harness had to be modified.

As far as the spatial configuration of the control platform or of the central distribution unit is concerned, wiring connections which could disturb each other electromagnetically can be placed at exactly defined distances from each other so that their electromagnetic compatibility is guaranteed. The central distribution unit is responsible for a calculable and clearly defined position of the wires in relation to each other. Additionally, screening measures can be taken comparably easily in the area of the central distribution unit, for example by installing screen webs, shrouds or casings. In contrast, the different wires of the traditional wiring harnesses are contained in the harnesses in an undefined way so that the mutual influence of the wires is unclear. Due to the increasing problems of electromagnetic compatibility, expensive twisted or screened wires must often be used up to the present time, for example.

The term "connecting wires" used in this document includes a variety of other wires such as foil wires, flat strips, hybrid wires, etc. as well as sheathed copper wires, and in particular multi-purpose wires that contain data conductors and power supply conductors within a common coating. If required, even optical cables, pneumatic or fluid conductors can also be installed in the wiring. If required it is also possible to install individual wires in the form of a by-pass to the central distribution unit, The term functional units on the engine or in the engine compartment means a wide variety of sensors, components using electrical current, actuators and the like. Such functional units connected to the distribution unit via the second connecting wires are, for example, ignition coil connections, variable camshaft controls, variable valve drive controls, knock sensors, revolution and torque sensors, lambda sensors, probes or injection valves.

The contacts between the interconnections and the central distribution unit can be made in a wide range of ways. Here, plug-in connections, clamp contacts, soldered joints, weld joints or similar contacts can be used. Thus both detachable and non-detachable connections can be considered.

The invention results in a wiring concept that is well suited for extensively automated production that can be optimised as far as the construction volume is concerned, that is flexible in terms of constructing variants and technical modifications and that is distinguished by a clearly organized wiring structure. The number of plug-in connections is reduced, and thus costs and assembly expenditure are also reduced. Thanks to the clearly organized spatial structure of the wiring that is object of the invention wiring mistakes during assembly can be reduced, i.e. another increase in quality can be achieved, and the replacement of individual interconnections can be achieved without problems. Also electromagnetic compatibility problems can be minimized, since interference-prone wires are placed far away from the corresponding sources of interference by means of a corresponding wiring configuration. Thanks to the carrier function of the central distribution unit for components with electrical and/or electronic functions, such as ignition high-stage levels, fuse switches or control devices, the number of interconnections required and the number of plug-in connections can be further optimised.

By mounting the central distribution unit on the drive unit, in particular on the engine, and by the integration of the control devices, such as the engine control devices for the ignition, injection, variable valve drive, etc. within the central distribution unit, the motor becomes a self-contained object, i.e. the engine unit can be tested separately including electrical/electronic components. A diagnostic plug can also be provided for example.

The central distribution unit can be arranged as an integral part of an already existing engine component, for example the cylinder head cover, the air intake or the air filter of the internal combustion engine. Thus, such an engine component can be used with advantage as a carrier unit and, if necessary, as protection for the positioning of the central distribution unit.

The central distribution unit is fitted if necessary with a suitable protective casing for mechanical protection against dirt, humidity, etc. and with its own active cooling system, for example a fan, for thermal protection. According to the invention, it was found that the central distribution unit can be positioned with advantage directly on the drive unit in spite of the increased temperatures caused by the internal combustion engine. The three dimensional form and arrangement of the protective casing of the central distribution unit and its internal space can be well adapted to the space available in the required location.

SHORT DESCRIPTION OF THE FIGURES

A preferred embodiment of the invention will now be detailed with reference to the attached drawings in which.

DESCRIPTION OF AN EMBODIMENT OF THE INVENTION

Figure 1:
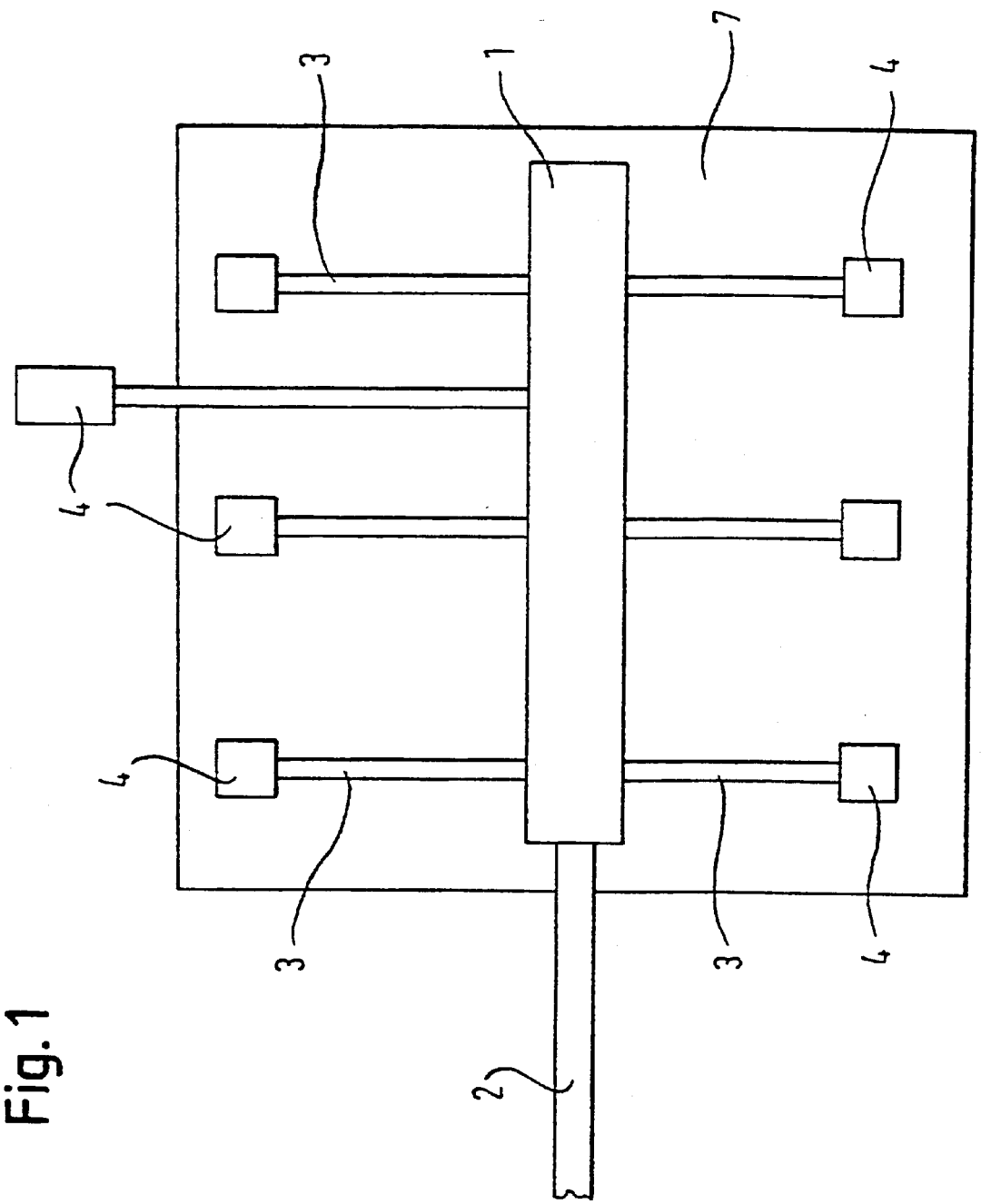
FIG. 1 shows a simplified schematic plan view of an embodiment of the electrical wiring system that is the object of the invention.

FIG. 1 shows the wiring of a drive unit of a motor vehicle. A drive unit with an internal combustion engine 7 is schematically illustrated in the figure, whereas the engine compartment itself and the rest of the motor vehicle are not shown in detail for reasons of clarity. In the motor vehicle a main connection 2 goes to the central distribution unit 1. From the distribution unit 1 interconnections 3 go to different functional components 4 of the internal combustion engine 7 and of the transmission. The functional components 4 are, for example, injection valves, ignition coil connections or sensors.

Both the main connection 2 and the interconnections 3 are configured as electrically non-branching point-to-point connections. In the case of the connections 2 and 3, wires are used that are standardized according to different lengths, conductor cross sections and numbers of pins. In the example foil conductors, for example so-called FFC (flexible flat cables), are used for the connections 2, 3.

FIG. 1 merely shows the basic principle of the wiring in accordance with the invention. From the central distribution unit 1, numerous other electrically non-branching point-to-point connections 3 (not shown) can be added to other functional units 4 either on the engine or in the engine compartment.

Figure 2:
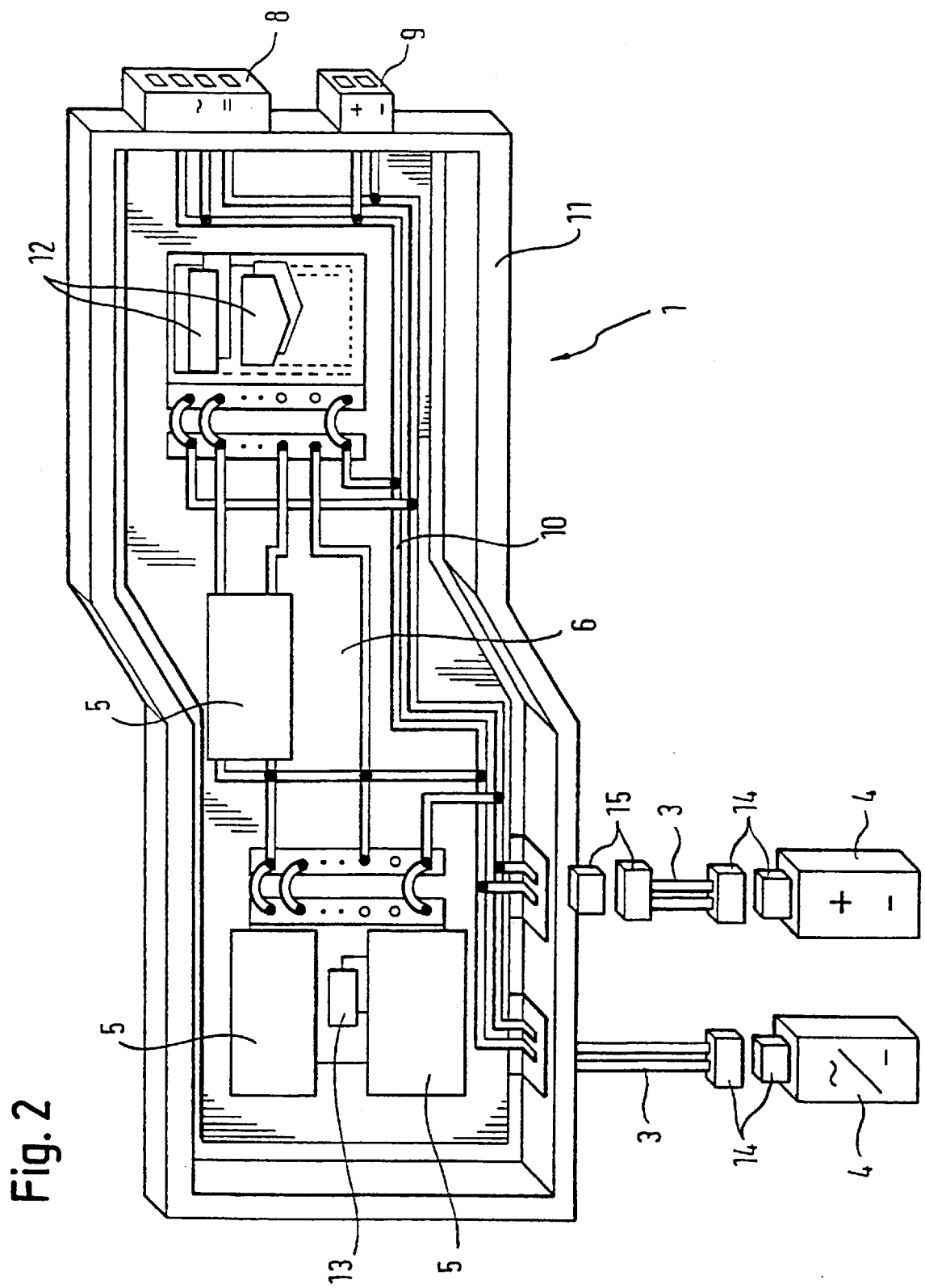
FIG. 2 shows a schematic plan view of the central distribution unit of the embodiment shown in FIG. 1.

The central distribution unit 1 is mounted on the internal combustion engine 7, for example on the air intake. As shown in FIG. 2, the central distribution unit 1 comprises a casing 11 (in FIG. 2 represented without the related cover) in which a FPC (flexible printed circuit) circuit board 6 is arranged, which completes a circuit to the connections 2, 3 via strip conductors 10. Furthermore, the circuit board 6 is fitted with electronic control modules 5 that control different engine and transmission functions, such as ignition, injection or valve drive functions of an engine management system. Furthermore, the circuit board 6 is fitted with other functional elements 12 and 13, such as transistor high-stage levels, relays or fuse modules.

FIG. 2 also shows a data interface 8 to the vehicle and a related energy supply interface 9 to the vehicle. Here, the interconnections 2 are connected to the vehicle (compare FIG. 1). Furthermore, FIG. 2 shows two connections 3 from the central distribution unit 1 to the functional units 4 as an example. The left connection 3 in FIG. 2 shows a so-called cable tail that is permanently fixed to the circuit board 6 and connected to the functional unit 4 via a plug-in connection 14. The right hand connection 3 in FIG. 2 is connected to the distribution unit 1 via a plug-in connection 15 and to the functional component 4 via a plug-in connection 14.

What is claimed is:

1. An electrical wiring system for a drive unit in a vehicle, comprising:
  a central distribution unit mounted on the drive unit and comprising a control platform with at least one electronic control module;
  first electrical connections detachably connectable between the vehicle and said central distribution unit, each of said first electrical connections being an electrically non-branching point-to-point main connection to a corresponding component in the vehicle;
  second electrical connections connected between said central distribution unit and functional components of the drive unit or detachably connectable between said central distribution unit and functional components within a surrounding engine compartment, each of said second electrical connections comprising an electrically non-branching point-to-point circuit connection to a corresponding functional component;

characterized in that circuit interconnections between selected first and selected second electrical connections are configured within the central distribution unit;

whereby said interconnected central distribution unit and functional components of said drive unit results in a pre-wired drive unit with related functional control electronics that is adapted to be fully bench-tested as a free-standing unit.

2. The electrical wiring system as set forth in claim 1, characterized in that the central distribution unit is mounted on an internal combustion engine or on the corresponding drive motor of the drive unit or on the ancillary components of the engine.

3. The electrical wiring system as set forth in claim 2, characterized in that the central distribution unit is mounted on an air intake of the internal combustion engine.

4. The electrical wiring system as set forth in claim 1, characterized in that the central distribution unit is mounted on a transmission of the drive unit.

5. The electrical wiring system as set forth in claim 1, characterized in that the control platform is configured as a circuit plate or FPC (flexible printed circuit) plate.

6. The electrical wiring system as set forth claim 1, characterized in that at least one electronic control module takes on the motor control functions and transmission control functions.

7. The electrical wiring system as set forth in claim 1, characterized in that the control platform carries additional active and passive electrical and electronic elements or modules.

8. The electrical wiring system as set forth in claim 7, characterized in that the electrical and electronic elements or modules comprise high-level power stages, relays or fuses.

9. The electrical wiring system as set forth in claim 7, characterized in that the electrical or electronic elements or modules comprise high-level power stages, relays or fuses.

10. The electrical wiring system as set forth in claim 1, characterized in that the control platform is configured in a modular way.

11. The electrical wiring system as set forth in claim 1, characterized in that at least one of said second electrical connections is detachably connected between said central distribution unit and its corresponding functional component.

12. The electrical wiring system as set forth claim 1, characterized in that at least one electronic control module takes on the motor control functions or transmission control functions.

13. The electrical wiring system as set forth in claim 1, characterized in that the control platform carries additional active and passive electrical or electronic elements or modules.

14. The electrical wiring system as set forth in claim 1, characterized in that the control platform carries additional active or passive electrical and electronic elements or modules.

15. The electrical wiring system as set forth in claim 1, characterized in that the control platform carries additional active or passive electrical or electronic elements or modules.

16. A drive arrangement of a vehicle having a drive motor which carries ancillary components and electrical functional units; and an electrical wiring of the drive motor having a central distribution unit mounted on the drive motor or on the ancillary components, said central distribution unit being detachably connectable to the vehicle via first electrical connections, connected to functional components of the drive motor via ones of second electrical connections and detachably connectable to selected functional units or other units that are outside the drive motor via others of second electrical connections;

the central distribution unit includes a control platform comprising at least one electronic control module for controlling drive motor functions, and wherein interconnection circuits between selected first and selected second connections are formed inside said central distribution unit;

characterized in that each of said first electrical connections being an electrically non-branching point-to-point main connection between said central distribution unit and a selected vehicle components, and each of said second electrical connections comprises an electrically non-branching point-to-point circuit connection between said central distribution unit and a selected functional unit or other unit outside the drive motor;

whereby said interconnected central distribution unit and functional components of said drive motor results in a pre-wired drive motor with related functional control electronics that is adapted to be fully bench-tested as a free-standing unit.

* * * * *